United States Patent [19]

Roberts

[11] Patent Number: 4,836,592
[45] Date of Patent: Jun. 6, 1989

[54] COFFEE FILTER SELECTOR

[76] Inventor: Robert E. Roberts, 2033 N. Sunset Rd., Apache Junction, Ariz. 85219

[21] Appl. No.: 182,409

[22] Filed: Apr. 18, 1988

[51] Int. Cl.$^4$ .................... A47F 13/04; A47L 13/00
[52] U.S. Cl. .................................... 294/1.1; 294/15
[58] Field of Search .................... 294/1.1, 15, 33; 15/104 R, 104 A, 231; 271/33

[56] References Cited

U.S. PATENT DOCUMENTS 4,640,539  2/1987  La Porte ........................ 294/1.1
4,676,396  6/1987  Mamolou ...................... 294/1.1

Primary Examiner—James B. Marbert
Attorney, Agent, or Firm—H. Gordon Shields

[57] ABSTRACT

Coffee filter selector apparatus includes a housing having a continuous length of adhesive material for contacting a coffee filter and for removing the contacted coffee filter from a stack of nested coffee filters. The adhesive material is manually wound from a supply reel over an idler wheel, which extends out of the housing and onto a takeup reel. The takeup reel includes outer peripheral notches for a ratcheting system and for allowing a predetermined linear length of adhesive to be advanced from the supply reel onto the takeup reel.

7 Claims, 1 Drawing Sheet

U.S. Patent
Jun. 6, 1989
4,836,592
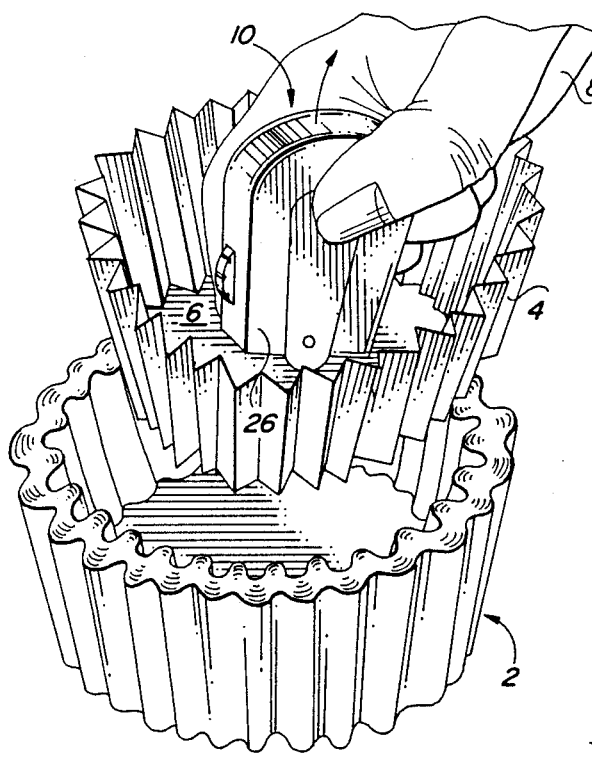
FIG. 1
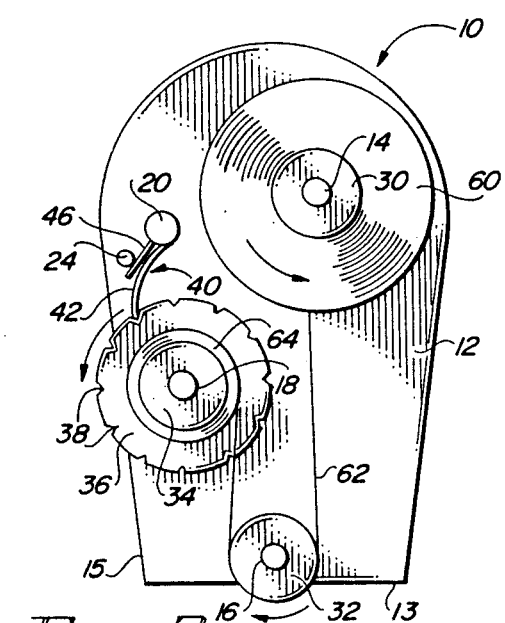
FIG. 2
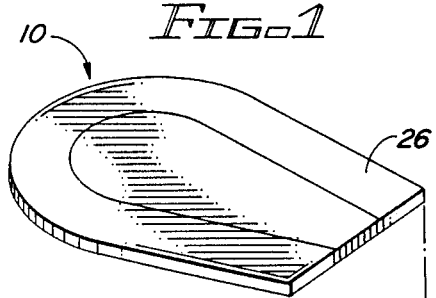
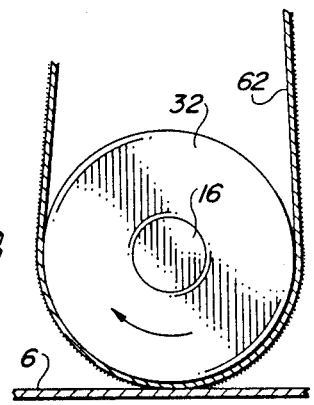
FIG. 3
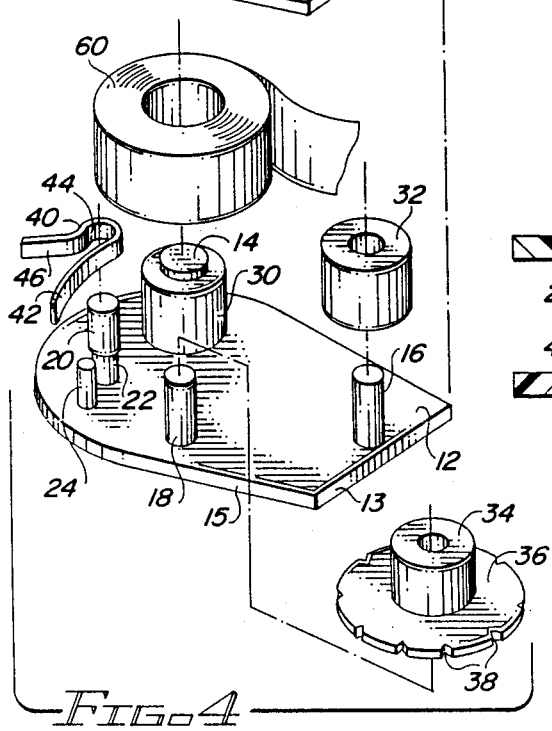
FIG. 4
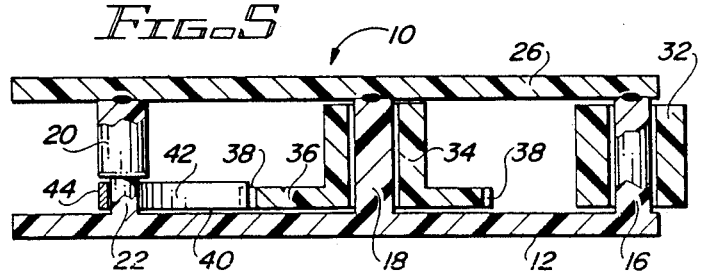
FIG. 5
FIG. 6

COFFEE FILTER SELECTOR

BACKGROUND OF THE INVENTION

1. Field of the Invention:

This invention relates to coffee filters, and more particularly, to selector apparatus for removing a single coffee filter from a nested stack of coffee filters in order to separate a single coffee filter from the plurality of nested coffee filters in the stack.

2. Description of the Prior Art:

Coffee filters are purchased in quantities of nested and stacked filters, one inside the other. Inherently, the filters have a tendency to stick together in a manner such that in removing a single coffee filter by itself can be a relatively difficult and cumbersome event. Moreover, the handling necessary for the coffee filter does not lend itself well to sanitary conditions. The apparatus of the present invention solves the problem of easily removing a single filter from a stack of nested filters in a relatively sanitary manner and quickly and expeditiously. The user's hands do not contact the filter until the filter is removed from the stack, and fresh adhesive material or tape is always available to insure sanitary conditions.

SUMMARY OF THE INVENTION

The invention described and claimed herein includes a housing having three rollers, including a supply roller, an active roller, and a takeup roller. The supply roller holds a quantity of adhesive tape material extending in a ribbon between the supply and takeup rollers. The active roller is disposed at an outer portion of the housing. The active roller is an idler wheel or roller over which the adhesive material extends. It comprises a use or function reel for the adhesive material. The adhesive tape material disposed about the use or function roller contacts the uppermost filter in a stack of coffee filters and causes the filter to adhere to the tape by means of the adhesive on the tape. The takeup roller or wheel includes a notched outer periphery. The space between notches is correlated with the length of adhesive material required for contacting and removing a filter. A ratchet spring contacts the notches to prevent the rewinding or reverse movement of the takeup wheel. Advancing the takeup wheel one notch, with respect to the ratchet spring, advances the adhesive tape the desired distance. The diameter of the functional roller is correlated with the length of adhesive tape material required to adhere to a filter for lifting the filter from the stack of filters.

Among the objects of the present invention are the following:

To provide new and useful apparatus for removing a filter from a stack of nested filters;

To provide new and useful apparatus for removing the uppermost object from a stack of objects by adhesively contacting the uppermost object;

To provide new and useful adhesive apparatus for adhesively contacting and adhering to an element in a stack of elements for removing a single element from the stack;

To provide new and useful reel apparatus for advancing a tape wound about a plurality of reels by a predetermined amount; and To provide a new and useful reel apparatus having a ratchet spring for allowing a takeup reel to move a predetermined distance in a predetermined direction.

BRIEF DESCRIPTION OF THE DRAWING

FIG. 1 is a perspective view of the apparatus of the present invention.

FIG. 2 is a side view of the apparatus of the present invention showing the elements thereon.

FIG. 3 is an enlarged side view of a portion of the apparatus illustrated in FIG. 2.

FIG. 4 is an exploded perspective view of the apparatus of the present invention.

FIG. 5 is a view in partial section of a portion of the apparatus of the present invention.

FIG. 6 is a view in partial section of another portion of the apparatus of the present invention.

DESCRIPTION OF THE PREFERRED EMBODIMENT

FIG. 1 is a perspective view showing a stack of coffee filters 2, with a single filter 4 being taken from the stack 2 by means of the apparatus of the present invention, coffee filter selector apparatus 10. The filter selector apparatus 10 is shown in FIG. 1, in a hand 8 of a user of the apparatus. The filter 4 includes a bottom portion 6, and the coffee filter selector apparatus 10 is secured to the bottom of the filter.

FIG. 2 is a side view of the apparatus 10 with a portion of the apparatus open or removed to illustrate the various elements of the apparatus. FIG. 3 is an enlarged view illustrating the functioning of some of the elements of the apparatus of the present invention. FIG. 4 is an exploded perspective view of the apparatus 10, and FIGS. 5 and 6 are enlarged views in partial section illustrating various elements of the apparatus 10. For the following discussion, reference will be made to all six Figures.

The apparatus 10 includes a base plate 12 and a top plate 26. The base plate 12 includes a bottom edge 13 and a side edge 15. Five pins are secured to the base plate 12 and extend upwardly or outwardly therefrom. The pins include a pin 14, a pin 16, a pin 18, a pin 20, and a pin 24. As shown in FIG. 4, the pin 20 includes a bottom reduced diameter portion 22. The purpose of the reduced diameter portion 22 is best illustrated in FIG. 5, and will be discussed in detail in conjunction with FIGS. 4 and 5, below.

A supply roller 30 is disposed on the pin 14, and is rotatable thereon. An active roller 32 is disposed on the pin 16, and is rotatable thereon. A portion of the roller 32 extends below or outwardly beyond the edge 13 of the plate 12.

A takeup roller 34 is disposed on the pin 18, and is rotatable thereon. The takeup roller 34 is secured to a takeup wheel 36. Or, as best shown in FIG. 4, the takeup roller 34 extends upwardly from the takeup wheel 36. The outer periphery of the takeup wheel 36 includes a plurality of spaced apart notches 38. The notches 38 extend about the periphery of the wheel 36 and cooperate with a ratchet spring element 40. A portion of the wheel 36 extends outwardly beyond the edge 15 of the plate 12.

The ratchet spring element 40 is disposed on the pin 20, or specifically, is disposed on the reduced diameter portion 22 of the pin 20, as shown in FIG. 5.

As best shown in FIG. 4, the ratchet spring element 40 includes a ratchet arm 42. The ratchet arm 42 is slightly curved, and is disposed in a manner to allow the takeup wheel 36, and the takeup roller 34, to rotate only in a counterclockwise direction, as indicated in FIG. 2 by the large curved arrow adjacent to the wheel 36 and the ratchet arm 42. The ratchet spring element 40 includes a post coil portion 44 which is disposed about the reduced diameter portion 22 of the pin 20. A spring arm 46 extends from the post coil portion 44 downwardly past the pin 24. This is best shown in FIG. 2. The pin 24 serves as a limit pin or a biasing pin for the spring arm 46. The pin 24 prevents the spring arm 46, and the ratchet arm 42 from disengaging from the takeup wheel 36. Or, phrased another way, the spring arm 46 and the pin arm 24 cooperate to maintain the ratchet arm 42 in engagement with the outer periphery of the takeup wheel 36, and particularly maintain the ratchet arm 42 in the notches 38 of the takeup wheel 36.

As best shown in FIG. 2, the outer periphery of the takeup wheel 36 extend outwardly beyond the plate 12. When the top plate 26 is secured to the top of the various posts, as shown in FIGS. 5 and 6, the outer portion of the wheel 36 extends outwardly beyond the adjacent side edges of both the bottom plate 12 and the top plate 26. As best shown in FIG. 4, the configuration of the plates 12 and 26 is the same, and they are appropriately aligned with each other. Accordingly, the outer periphery of the wheel 36 is available or is convenient for direct contact by the thumb or a finger of a user to rotate the wheel.

A tape supply coil 60 is disposed on the supply roller 30. Tape 62 from the tape supply coil 60 extends from the supply coil 60 down to, and around, the active roller 32, and up to the takeup roller 34. Rotation of the takeup roller 34 by rotation of the takeup wheel 36 causes the tape to be wound onto the roller 34 and accordingly to be wound off the coil 60 and around the outer periphery of the active roller 32.

As best shown in FIG. 2, a portion of the outer periphery of the active roller 32 extends beyond the bottom edge 13 of the plate 12 (and also of the plate 26). With the sticky side of the tape 62 facing outwardly, and thus contacting the bottom 6 of the filter 4, the adhesive action between the tape 62 and the bottom 6 allows the filter 4 to be removed from the stack 2. This is illustrated in FIGS. 1 and 3.

Since the bottom 6 of the filter 4 is flexible or pliable, after initial contact between the adhesive side of the tape 62 and the bottom 6, as shown in FIG. 3, a slight downward pressure on the apparatus 10 will cause contact over a greater surface of the tape 62 with the bottom 6 than is shown in FIG. 3. This occurs by virtue of the deformation of the bottom 6 of the filter 4 and of the other filters in the stack 2. Sufficient contact is made between the bottom 6 and tape 62 to cause the bottom 6 and the filter 4, to adhere to, or to stick to, the apparatus 10. Specifically, a single filter sticks or adheres to the tape 62 of the apparatus 10 to allow a single filter 4 to be removed form the nested or stacked coffee filters 2.

It has been found that sufficient stickiness will remain on the tape 62 to allow more than one filter to be removed without rotating the tape 62 to provide a new portion of the tape 62 for removing the next filter in the stack or nest of filters.

Typically, a single length of tape will remove three or four filters before new tape is required. When it is desirable to rotate the tape 62, a user rotates the wheel 36 in a counter-clockwise direction, again as shown by an arrow in FIG. 2, a predetermined distance. The predetermined distance, in accordance with the distance adjacent notches 38, or the short distance between the notches 38, in the outer periphery of the wheel 36.

The notches 38 are spaced apart a distance sufficient to allow the tape 62 to be moved to a fresh, unused portion, on the roller 32, or specifically at the bottom of the roller 32, to provide a sufficient length of tape available for new use. The employmnet of the wheel 36, with its notches 38, insures that the tape 62 will move only a predetermined distance sufficient to provide the desired length of new tape available at the bottom of the roller 32. This, of course, results in the most economical and efficient use of the tape 62.

If desired, the sides 12 and 21 could be joined with peripheral sides to substantially and completely enclose the pins and rollers, except for appropriate openings for the roller 32 and for the wheel 36. Such is shown in FIG. 1. On the other hand, such an edge covering need not be utilized. The generally horse shoe shape configuration of the sides 12 and 26, and thus the general configuration of the apparatus 10, is merely for illustrative purposes. As best illustrated in FIG. 4, with respect to the plates 12 and 26, the general horse shoe configuration suggests a horse shoe magnet. This is, of course, a fanciful parallel between a magnet for picking up metal and the apparatus 10 for removing a filter from the stack of filters.

In actuality, the apparatus 10 may be configured in any particular manner, as deemed desirable. The tape 62, between the supply coil 60 and the active roller 32, should, of course, be protected, and accordingly should be enclosed to some extent, such as at least being disposed between the plates 12 and 26. Moreover, the outer peripheries of the active roller 32 and takeup wheel 36 must be convenient for access to the filters, for the roller 32, and to the thumb or finger of the user, for the wheel 36.

The ratchet spring element 40 may be metal or plastic, as desired.

The plate 26 is shown as solvent welded to the top of the posts 14, 16, 18, and 20 in FIGS. 5 and 6. However, the top plate 26 will preferably be frictionally snapped together to one or more of the several posts to allow the plate 26 to be removed, as when it is necessary to replace the supply coil 60.

On the other hand, an integral unit, as suggested in FIGS. 5 and 6, may also be utilized if the apparatus 10 is to be a throwaway item which may be disposed of when the supply coil 60 is exhausted. Obviously, if the supply coil is to be replaced, then the top plate 26 must be removable. That is, in some manner, the plate 26 and the plate 12 must be separable to allow for the replacement of the supply coil 60 on the supply roller 30.

Moreover, if desired, the supply roller 60 may be disposed directly on the pin 14, thus obviating the requirement or need for a supply roller 30. In some cases, the supply coil 60 will include its own roller 30, and thus both the roller and the coil may be replaced on pin 14 as a single unit. In other cases, the supply coil 60 may come without a roller, and may be fitted over the roller 30. In some other cases, the supply coil 60 may be disposed directly on the pin 14 without a roller. Obviously, many alternatives are possible for the apparatus. However, the sticky or adhesive portion of the tape 62 of roller 32 must be on the outside of the coil 60 or must be disposed on the outer portion of the tape 62 as the tape 62 passes over the active roller 32.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for adhesively removing an element from a stack of elements, comprising, in combination:
   base means for supporting elements secured thereto;
   tape means secured to and movable on the base means, including
      a length of tape having an ashesive side for contacting the element and for adhering to the contacted elements, and
      takeup roller means secured to the length of tape for advancing the length of tape, including
         a takeup roller, and
         a takeup wheel secured to the takeup roller and movement of the takeup wheel causes movement of the takeup roller to advance the length of tape; and
   means for advancing the takeup roller means a predetermined distance to advance the length of tape, including
      a plurality of spaced apart notches on the takeup wheel, with the space between the notches corresponding to the predetermined distance which the length of tape advances, and
      means extending into a notch for limiting the movement of the takeup wheel.

2. The apparatus of claim 1 in which the tape means includes a supply of tape, and the length of tape extends from the supply of tape to the takeup roller means.

3. The apparatus of claim 2 in which the tape means further includes a first roller over which the length of tape extends for contacting the element.

4. The apparatus of claim 1 in which the means extending into a notch includes
   spring means, including a ratchet arm extending into a notch to limit the movement of the takeup wheel.

5. The apparatus of claim 4 in which the base means includes
   a base plate,
   a first pin secured to the base plate, and
   a second pin secured to the base plate.

6. The apparatus of claim 5 in which the spring means includes
   a post coil portion disposed about the first pin and secured to the ratchet arm, and
   a spring arm secured to the post coil portion and disposed against the second pin to bias the ratchet arm against the takeup wheel.

7. The apparatus of claim 6 in which the base means further includes
   a third pin, and the takeup roller means is rotatably secured to the third pin, and
   a fourth pin, and the tape means is rotatably secured to the fourth pin.

* * * * *